United States Patent
Mercier-Calvairac et al.

(10) Patent No.: US 10,214,296 B2
(45) Date of Patent: Feb. 26, 2019

(54) ARCHITECTURE OF A MULTI-ENGINE HELICOPTER PROPULSION SYSTEM AND CORRESPONDING HELICOPTER

(71) Applicant: SAFRAN HELICOPTER ENGINES, Bordes (FR)

(72) Inventors: Fabien Mercier-Calvairac, Pau (FR); Sophie Humbert, Pau (FR); Stephane Beddok, Pau (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 323 days.

(21) Appl. No.: 15/128,063

(22) PCT Filed: Mar. 20, 2015

(86) PCT No.: PCT/FR2015/050698
§ 371 (c)(1),
(2) Date: Sep. 21, 2016

(87) PCT Pub. No.: WO2015/145042
PCT Pub. Date: Oct. 1, 2015

(65) Prior Publication Data
US 2017/0096233 A1   Apr. 6, 2017

(30) Foreign Application Priority Data
Mar. 27, 2014   (FR) ...................... 14 52651

(51) Int. Cl.
*B64D 35/08*     (2006.01)
*B64C 27/04*     (2006.01)
(Continued)

(52) U.S. Cl.
CPC .............. *B64D 35/08* (2013.01); *B64C 27/04* (2013.01); *B64D 41/00* (2013.01); *F02C 7/262* (2013.01);
(Continued)

(58) Field of Classification Search
CPC .. B64D 35/08; B64D 37/00; B64D 2027/026; B64D 27/58; B64C 27/08; B64C 27/12;
(Continued)

(56) References Cited

U.S. PATENT DOCUMENTS 2,723,531 A * 11/1955 Wosika .................. B64D 41/00
                                                          244/55
5,512,811 A *  4/1996 Latos ...................... F02N 11/04
                                                          318/400.13
(Continued)

FOREIGN PATENT DOCUMENTS

CA    2942942 A1 * 10/2015 ............. B64D 35/08
EP    2264297         12/2010
(Continued)

OTHER PUBLICATIONS

International Search Report with English Language Translation, dated Jul. 14, 2015, PCT Application No. PCT/FR2015/050698.

*Primary Examiner* — Christopher P Ellis
(74) *Attorney, Agent, or Firm* — Womble Bond Dickinson (US) LLP

(57) ABSTRACT

The invention relates to an architecture of a propulsion system of a multi-engine helicopter, comprising turboshaft engines (1, 2) that are connected to a power transmission gearbox (3), and comprising a low DC voltage onboard network (7) for supplying helicopter equipment during flight, characterized in that it comprises: a hybrid turboshaft engine (1) that is capable of operating in at least one standby mode during a stable flight of the helicopter; an electrotechnical pack (20) for quickly restarting said hybrid turboshaft engine in order to bring said engine out of said standby mode and to reach a mode in which it provides mechanical power, said restart pack (20) being connected to said onboard
(Continued)

Figure 1:
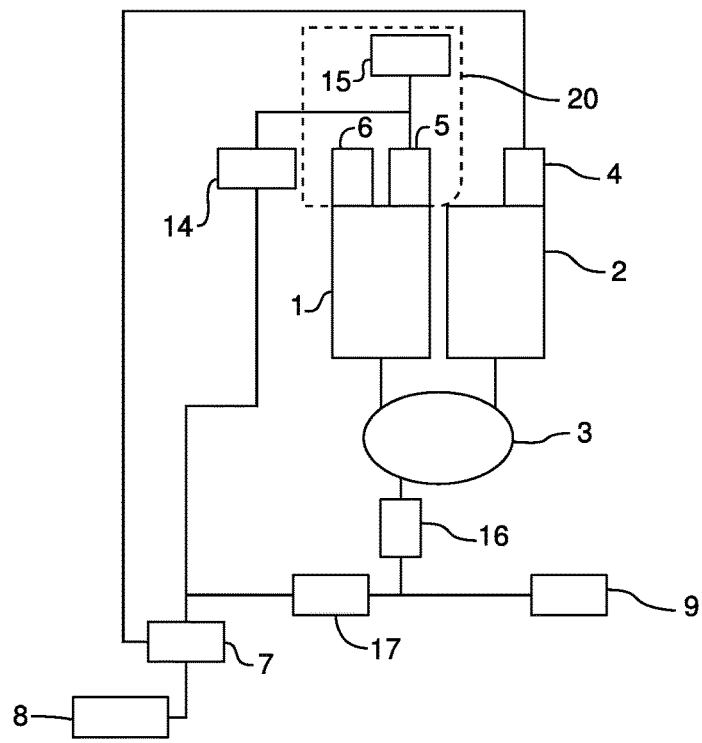

network (7); and at least two sources (4, 16, 18) of electrical power for said onboard network (7).

9 Claims, 3 Drawing Sheets

(51) Int. Cl.
    *F02C 7/262*     (2006.01)
    *F02C 7/275*     (2006.01)
    *F02C 9/42*     (2006.01)
    *B64D 41/00*     (2006.01)
    *F02C 7/36*     (2006.01)
    *B64D 27/02*     (2006.01)

(52) U.S. Cl.
    CPC .............. *F02C 7/275* (2013.01); *F02C 7/36* (2013.01); *F02C 9/42* (2013.01); *B64D 2027/026* (2013.01); *F05D 2220/30* (2013.01); *F05D 2220/329* (2013.01); *F05D 2220/50* (2013.01); *F05D 2220/70* (2013.01); *F05D 2220/76* (2013.01); *Y02T 50/671* (2013.01)

(58) Field of Classification Search
    CPC ........ B64C 27/14; F05D 220/76; F02C 7/262; F02C 7/36; F02C 7/268; F02C 7/275
    See application file for complete search history.

(56) References Cited

U.S. PATENT DOCUMENTS

| | | | |
|---|---|---|---|
| 5,899,411 A | | 5/1999 | Latos et al. |
| 9,267,438 B2 * | | 2/2016 | Dooley ................... F02C 7/26 |
| 9,429,077 B2 * | | 8/2016 | Morgan .................. F02C 7/36 |
| 9,828,917 B2 * | | 11/2017 | Klonowski ............. F01D 15/10 |
| 9,840,997 B2 * | | 12/2017 | Dooley ................... F02C 7/26 |
| 9,873,520 B2 * | | 1/2018 | Guillot ..................... H02J 1/08 |
| 2015/0122944 A1 * | | 5/2015 | Dauriac ................ B64D 35/08 |
| | | | 244/58 |
| 2016/0237917 A1 * | | 8/2016 | Marconi ................. F02C 6/206 |
| 2017/0184032 A1 * | | 6/2017 | Poumarede ............. F02C 3/10 |
| 2017/0305541 A1 * | | 10/2017 | Vallart .................... F01D 13/00 |
| 2017/0327241 A1 * | | 11/2017 | Mitrovic ................ B64C 27/12 |
| 2018/0201386 A1 * | | 7/2018 | Strauss .................. F02C 7/262 |

FOREIGN PATENT DOCUMENTS

| | | |
|---|---|---|
| EP | 2404775 | 1/2012 |
| EP | 2581586 | 4/2013 |
| WO | WO-2013167837 | 11/2013 |

\* cited by examiner

ARCHITECTURE OF A MULTI-ENGINE HELICOPTER PROPULSION SYSTEM AND CORRESPONDING HELICOPTER

TECHNICAL FIELD OF THE INVENTION

The invention relates to an architecture of a propulsion system of a multi-engine helicopter, in particular a twin-engine or three-engine helicopter, and to a helicopter comprising a propulsion system having an architecture of this kind.

TECHNOLOGICAL BACKGROUND

As is known, a twin-engine or three-engine helicopter has a propulsion system comprising two or three turboshaft engines, each turboshaft engine comprising a gas generator and a free turbine which is rotated by the gas generator and is rigidly connected to an output shaft. The output shaft of each free turbine is suitable for inducing the movement of a power transmission gearbox (referred to in the following by the abbreviation PTG), which itself drives the rotor of the helicopter which is equipped with blades having a variable pitch.

Each turboshaft engine is generally equipped with a starter-generator for the initial start-up of the turboshaft engine and also for supplying power to the low DC voltage onboard network (referred to in the following by the abbreviation OBN) during flight. The OBN is generally connected to a device for storing low-voltage electricity, for example a 28-volt storage battery.

There are also architectures in which the OBN is also supplied with power via an auxiliary power unit (APU) and via an AC/DC converter.

There are also architectures in which the starter and generator functions of each turboshaft engine are separate. In this case, the generator function is achieved by taking power from the PTG (generally of 115 volts AC), followed by conversion by an AC/DC converter.

Furthermore, it is known that, when the helicopter is in a cruise flight situation (i.e. when it is progressing in normal conditions, in AEO (all engines operative) mode, during all the flight phases apart from transitional phases of take-off, landing or hovering flight), the turboshaft engines operate at low power levels, below their maximum continuous output (hereinafter MCO). In some arrangements, the power provided by the turboshaft engines during a cruise flight can be less than 50% of the maximum take-off output (hereinafter MTO). These low power levels result in a specific consumption (hereinafter SC), which is defined as the relationship between the hourly fuel consumption by the combustion chamber of the turboshaft engine and the power provided by said turboshaft engine, which is approximately 30% greater than the SC of the MTO, and a reduction in the efficiency of the gas turbines.

In order to reduce this consumption during cruise flight (or during holding on the ground for example), it is possible to stop one of the turboshaft engines and to put it into a mode known as standby. The active engine or engines then operate at higher power levels in order to provide all the necessary power, and therefore at more favourable SC levels.

In the following, "economical flight phase" will denote a flight phase during which at least one turboshaft engine is in standby mode, and "conventional flight phase" will denote a flight phase during which none of the turboshaft engines are in standby mode.

In FR1151717 and FR1359766, the applicants proposed methods for optimising the specific consumption of the turboshaft engines of a helicopter by the possibility of putting at least one turboshaft engine into a stable flight mode, referred to as continuous flight mode, and at least one turboshaft engine into a particular standby mode that it can leave in emergencies or in a normal manner, according to need. A transition out of the standby mode is referred to as 'normal' when a change in the flight situation requires the turboshaft engine in standby to be activated, for example when the helicopter is going to transition from a cruise flight situation to a landing phase. A normal transition out of standby mode of this kind occurs over a period of between 10 seconds and 1 minute. A transition out of the standby mode is referred to as an 'emergency' when a there is a power failure or a power deficit in the active engine, or when the flight conditions suddenly become difficult. An emergency transition out of standby mode of this kind occurs over a period of less than 10 seconds.

A turboshaft engine leaves a standby mode and transitions from an economical flight phase to a conventional flight phase for example by means of an emergency assistance device that comprises incandescent "glow-up" spark plugs as a near-instantaneous ignition device, supplementing the conventional spark plugs, and a propellant cartridge that feeds an auxiliary micro-turbine as a mechanical means for accelerating the gas generator of the turboshaft engine.

Such a device for restarting the turboshaft engine in standby has the disadvantage of substantially increasing the total weight of the turboshaft engine. The benefit in terms of fuel consumption obtained by placing the turboshaft engine in standby is thus partly lost by the excess weight brought about by the restart device, in particular when each turboshaft engine is equipped with an emergency restart device of this type.

The inventors have thus sought to solve problems which are incompatible a priori, namely the possibility of placing the helicopter in the economical flight phase, i.e. of placing at least one turboshaft engine in standby, without increasing the weight of the overall propulsion system too much but whilst also allowing the OBN to be supplied with electrical power.

In other words, the inventors have sought to propose a new architecture of the propulsion system of a twin-engine or three-engine helicopter.

AIMS OF THE INVENTION

The invention aims to provide a new architecture of the propulsion system of a multi-engine helicopter.

The invention also aims to provide an architecture of a propulsion system of a multi-engine helicopter which allows a turboshaft engine to be placed in standby and allows the quick restart thereof.

The invention also aims to provide, in at least one embodiment of the invention, an architecture of a propulsion system which has a mass and a volume which are acceptable for being installed in a helicopter.

The invention also aims to provide, in at least one embodiment of the invention, an architecture of a propulsion system which has a lower cost than the architectures from the prior art that have the same performance.

DISCLOSURE OF THE INVENTION

In order to achieve this, the invention relates to an architecture of a propulsion system of a multi-engine helicopter, comprising turboshaft engines that are connected to a power transmission gearbox (referred to in the following by the abbreviation PTG), and comprising a low DC voltage onboard network (referred to in the following by the abbreviation OBN) for supplying power to the helicopter equipment during flight.

The architecture according to the invention is characterised in that it comprises:

one turboshaft engine among said turboshaft engines, referred to as a hybrid turboshaft engine, which is capable of operating in at least one standby mode during a stable flight of the helicopter, the other turboshaft engines operating alone during this stable flight, an electrotechnical pack for quickly restarting said hybrid turboshaft engine in order to bring said engine out of said standby mode and to reach a mode referred to as the nominal mode, in which it provides mechanical power to said power transmission gearbox, said restart pack being connected to said OBN, at least two sources of electrical power for said OBN.

A hybrid turboshaft engine is a turboshaft engine that is configured so as to be able to be placed, on demand and voluntarily, in at least one predetermined standby mode that it can leave in a rapid (also referred to as emergency) or normal manner. A turboshaft engine can only be in standby mode during a stable flight of the helicopter, i.e. when no turboshaft engine of the helicopter has failed, during a cruise flight situation when it is progressing in normal conditions.

Leaving the standby mode consists in changing the turboshaft engine into a mode for accelerating the gas generator by means of driving in a manner that is compatible with the leaving mode required by the conditions (normal standby-leaving mode or rapid (also referred to as emergency) standby-leaving mode).

Therefore, the architecture of a propulsion system of a multi-engine helicopter according to the invention has just one hybrid turboshaft engine that is capable of operating in a standby mode. The architecture according to the invention is therefore asymmetrical and has just one hybrid turboshaft engine. An architecture according to the invention thus minimises the number of components by providing that just one turboshaft engine can be put in standby mode. Only the hybrid turboshaft engine is equipped with an electrotechnical restart pack, thus limiting the total weight of the propulsion system.

Furthermore, the architecture provides two sources of electrical power for the OBN. The architecture therefore has redundancy in the electrical power generation for supplying power to the OBN, meaning that a possible failure of the first power source for the OBN is compensated for by the second power source.

Advantageously and according to the invention, said electrotechnical pack for quick restart is a high-voltage pack, and a low voltage-high voltage converter is arranged between the OBN and the restart pack.

A high-voltage pack makes it possible to achieve a quick restart of the turboshaft engine. In addition, a low voltage-high voltage converter is arranged between the low-voltage OBN and the restart pack in order for it to be possible for the OBN to supply power to the restart pack.

Advantageously and according to the invention, said sources of electrical power for said OBN are selected from the group comprising:

at least one generator that is arranged between the PTG and the OBN and is associated with an AC-DC converter, an auxiliary power unit that is connected to the OBN and associated with an AC-DC converter, a starter-generator that is arranged between a non-hybrid turboshaft engine and the OBN.

Advantageously and according to the invention, each generator and said auxiliary power unit are capable of providing an AC voltage of 115 volts, and said associated converter is capable of converting said 115-volt AC voltage into a DC voltage of 28 volts.

Any combination is possible in order to ensure redundancy in the supply of electrical power for the OBN.

According to an advantageous variant, a first electrical power source is a generator that is arranged between the PTG and the OBN and associated with an AC-DC converter, and a second electrical power source is a starter-generator that is arranged between a non-hybrid turboshaft engine and the OBN.

According to this advantageous variant, during what is known as a conventional flight phase of a twin-engine helicopter (i.e. when all the turboshaft engines are operating in a mode for providing mechanical power to the power transmission gearbox), all the turboshaft engines provide the PTG with the power required for driving the rotor of the helicopter. The electrical generation of the OBN is made reliable by the redundancy of the starter-generator on the non-hybrid turboshaft engine and of the generator that is arranged on the PTG and associated with the AC-DC converter.

During an economical flight phase, the hybrid turboshaft engine is in standby and the other turboshaft engine provides the necessary power to the PTG. The electrical generation of the OBN is made reliable by the redundancy of the starter-generator on the non-hybrid turboshaft engine and of the generator that is arranged on the PTG and associated with the AC-DC converter.

In the event of the loss of the non-hybrid turboshaft engine, the hybrid turboshaft engine is emergency restarted by means of the electrotechnical restart pack. Even though the non-hybrid turboshaft engine has stopped, the supply of power to the OBN is ensured by the generator that is arranged on the PTG and associated with the AC-DC converter.

Advantageously, the restart pack further comprises a device for storing high-voltage electrical energy, which is capable of accumulating electrical energy from the OBN during said nominal mode of said hybrid turboshaft engine, making it possible to provide mechanical power to the power transmission gearbox, and which is capable of providing, on demand, the accumulated electrical energy that is required for said hybrid turboshaft engine to leave standby mode.

The turboshaft engine in standby is thus restarted by means of the high-voltage energy storage device which is arranged between the turboshaft engine and the low voltage-high voltage converter.

Advantageously and according to the invention, said restart pack is capable of providing, when said hybrid turboshaft engine is in the standby mode, electrical energy for keeping said hybrid turboshaft engine in a predetermined standby mode.

In particular, a turboshaft engine comprises, as is known, a gas generator and a free turbine that is supplied with the gases from the gas generator. The gas generator comprises a shaft and a combustion chamber that is supplied with fuel. Advantageously and according to the invention, the standby mode can be one of the following modes:

a standby mode referred to as normal idling, in which said combustion chamber is ignited and said shaft of the gas generator rotates at a speed of between 60 and 80% of the nominal speed, a standby mode referred to as normal super-idling, in which said combustion chamber is ignited and said shaft of the gas generator rotates at a speed of between 20 and 60% of the nominal speed, a standby mode referred to as assisted super-idling, in which said combustion chamber is ignited and said shaft of the gas generator rotates, with mechanical assistance, at a speed of between 20 and 60% of the nominal speed, a standby mode referred to as turning, in which said combustion chamber is extinguished and said shaft of the gas generator rotates, with mechanical assistance, at a speed of between 5 and 20% of the nominal speed, a standby mode referred to as shutdown, in which said combustion chamber is extinguished and said shaft of the gas generator is at a complete stop.

Each of the standby modes mentioned above can thus be assisted by the electrotechnical pack in order to keep the hybrid turboshaft engine in a predetermined standby mode. This electrical assistance can be taken directly from the onboard network of the helicopter or taken from the energy storage device. Preferably, the assistance is taken from the onboard network so that the storage device keeps the maximum amount of energy in order for the hybrid turboshaft engine to be brought out of standby, in particular in emergencies. For example, in the case of the turning mode, the onboard network can supply power to a device for mechanically assisting the gas generator of the hybrid turboshaft engine.

Advantageously and according to the invention, the quick restart pack comprises an electrical machine that is capable of restarting said turboshaft engine when leaving standby in normal conditions, and a device for leaving standby that is capable of restarting said turboshaft engine when leaving standby in emergency conditions.

According to this variant, the electrotechnical restart pack comprises an energy storage device, an electrical machine and a device for leaving standby in an emergency. This device for leaving standby in an emergency can be an electrotechnical, pyrotechnic, pneumatic or hydraulic device.

A mode for leaving standby in an emergency is a mode in which the combustion chamber is ignited and the shaft of the gas generator is brought to a speed of between 80 and 105% within a period of less than 10 seconds following an order to leave standby.

A mode for leaving standby normally is a mode in which the combustion chamber is ignited and the shaft of the gas generator is brought to a speed of between 80 and 105% within a period of between 10 seconds and 1 minute following an order to leave standby mode.

The invention also relates to a helicopter comprising a propulsion system, characterised in that said propulsion system has an architecture according to the invention.

The invention also relates to an architecture of a propulsion system of a multi-engine helicopter, and to a helicopter equipped with a propulsion system having an architecture of this kind, characterised in combination by all or some of the features mentioned above or in the following.

LIST OF DRAWINGS

Figure 2:
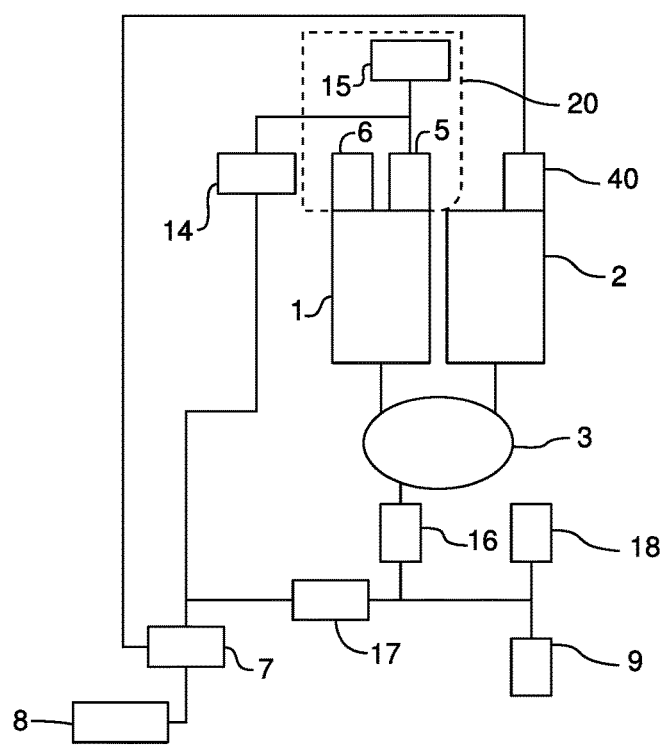
Figure 3A:
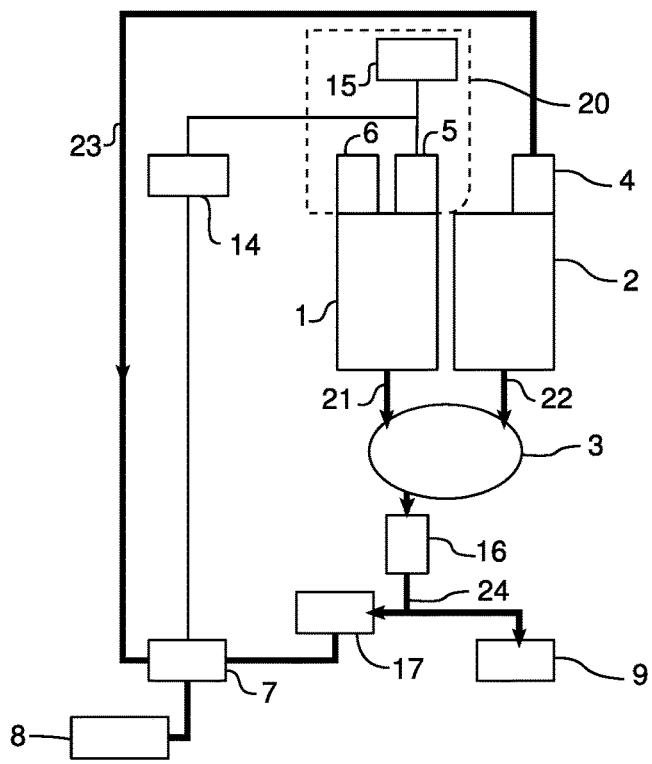
Figure 3B:
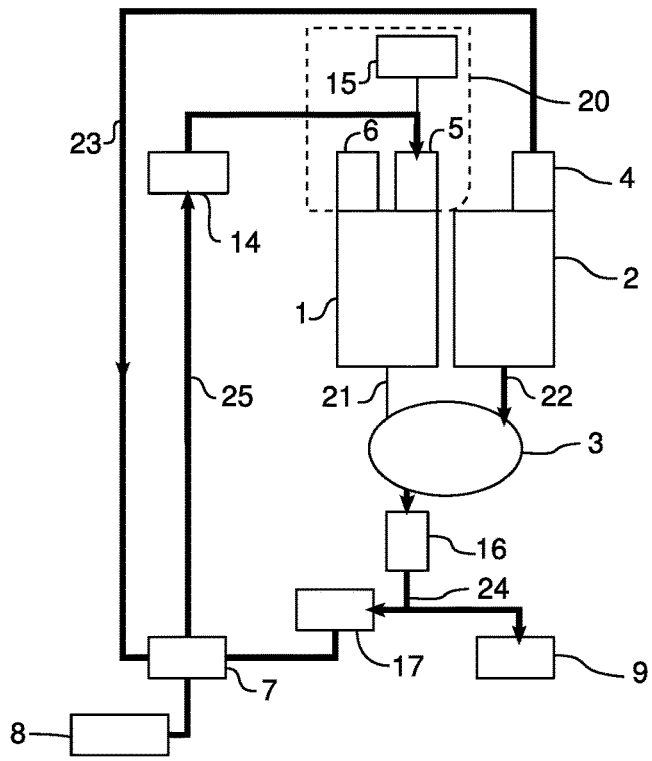
Figure 3C:
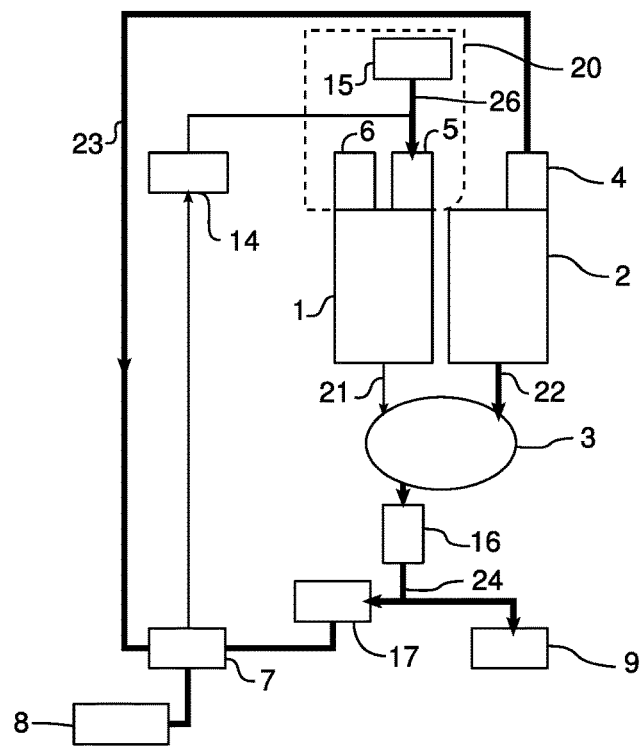
Figure 3D:
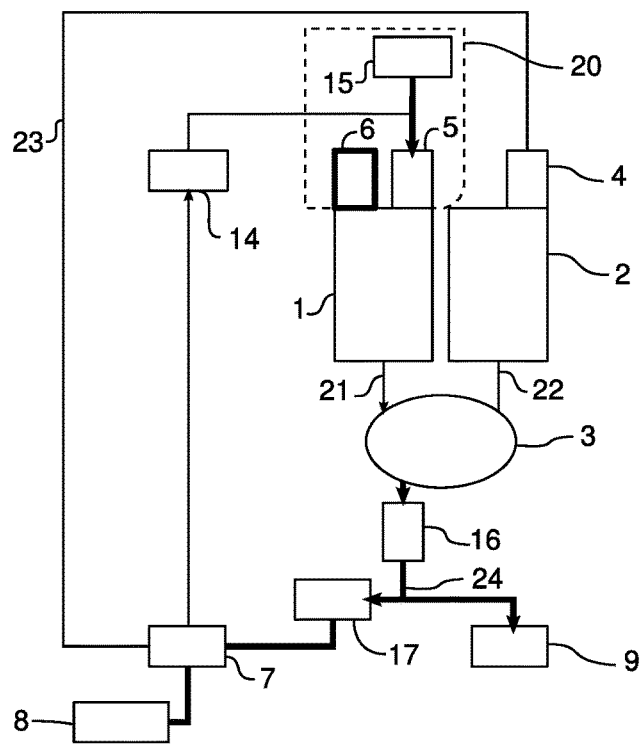

Other aims, features and advantages of the invention will emerge from reading the following description, which is given purely by way of non-limiting example and relates to the accompanying drawings, in which:

FIG. 1 is a schematic view of an architecture of a propulsion system of a twin-engine helicopter according to an embodiment of the invention, FIG. 2 is a schematic view of an architecture of a propulsion system of a twin-engine helicopter according to a further embodiment of the invention, FIG. 3a is a schematic view of the architecture from FIG. 1 during a conventional flight phase, in which all the turboshaft engines are operating in a mode for providing mechanical power, FIG. 3b is a schematic view of the architecture from FIG. 1 during an economical flight phase, in which one turboshaft engine is in standby mode, FIG. 3c is a schematic view of the architecture from FIG. 1 as the turboshaft engine in standby is leaving standby in a normal manner, FIG. 3d is a schematic view of the architecture from FIG. 1 during a phase of leaving standby in an emergency following failure of the other turboshaft engine.

DETAILED DESCRIPTION OF AN EMBODIMENT OF THE INVENTION

FIG. 1 is a schematic view of an architecture of a propulsion system of a twin-engine helicopter according to an embodiment of the invention. This architecture comprises two turboshaft engines 1, 2 that are connected to a power transmission gearbox 3. Each turboshaft engine 1, 2 is controlled by its own inspection-control device, which is not shown in the drawings for reasons of clarity. The architecture further comprises a low DC voltage 28-volt onboard network 7 intended for supplying current to various items of equipment of the helicopter, which are not shown in the drawings for reasons of clarity.

Each turboshaft engine comprises a gas generator and a free turbine that is rigidly connected to an output shaft rotated by the gas generator. The output shaft of each free turbine is suitable for inducing the movement of the power transmission gearbox 3 (referred to in the following by the abbreviation PTG), which itself drives the rotor of the helicopter which is equipped with blades having a variable pitch.

According to the invention, the turboshaft engine 1 is a hybrid turboshaft engine that is capable of operating in at least one standby mode during a stable flight of the helicopter.

This standby mode is preferably selected from the following operating modes:

a standby mode referred to as normal idling, in which the combustion chamber is ignited and the shaft of the gas generator rotates at a speed of between 60 and 80% of the nominal speed, a standby mode referred to as normal super-idling mode, in which the combustion chamber is ignited and the shaft of the gas generator rotates at a speed of between 20 and 60% of the nominal speed, a standby mode referred to as assisted super idling, in which the combustion chamber is ignited and the shaft of the gas generator rotates, with mechanical assistance, at a speed of between 20 and 60% of the nominal speed, a standby mode referred to as turning, in which the combustion chamber is extinguished and the shaft of the gas generator rotates, with mechanical assistance, at a speed of between 5 and 20% of the nominal speed, a standby mode referred to as shutdown, in which the combustion chamber is extinguished and the shaft of the gas generator is at a complete stop.

The architecture further comprises an electrotechnical pack 20 for quickly restarting the hybrid turboshaft engine 1 in order to bring it out of the standby mode and to reach a mode for providing mechanical power to the power transmission gearbox. This pack 20 is a high-voltage pack that is arranged between the turboshaft engine 1 and the OBN 7 by means of a high voltage-low voltage converter 14.

According to the embodiment in the drawings, the electrotechnical quick restart pack 20 comprises an electrical machine 5 that is capable of restarting the hybrid turboshaft engine 1 when leaving standby in normal conditions (i.e. within a period of between 10 seconds and 1 minute following the order for the turboshaft engine 1 to leave standby). Said pack also comprises a device 6 for leaving standby in an emergency that is capable of restarting the turboshaft engine 1 when leaving standby in emergency conditions (i.e. within a period of less than 10 seconds following the order for the turboshaft engine 1 to leave standby). Said pack also comprises an energy storage device 15 which is capable of accumulating electrical energy provided by the OBN 7 when the hybrid turboshaft engine 1 is in standby, and which is capable of providing the electrical machine 5 and the device 6 for leaving standby with the electrical energy that is necessary for restarting the hybrid turboshaft engine 1.

An architecture according to the invention further comprises two sources of electrical power for the OBN 7.

According to the embodiment in FIG. 1, the first source of power for the OBN 7 is a generator 16 that provides an AC voltage of 115 volts. The generator 16 is arranged between the PTG 3 and the OBN 7, and is associated with an AC-DC converter 17. According to the embodiment in FIG. 1, the second source of power for the OBN 7 is a starter-generator 4 that provides a DC voltage of 28 volts and is arranged between the turboshaft engine 2 and the OBN 7. This starter-generator 4 is capable of ensuring the first start-up of the turboshaft engine 2 and of ensuring the supply of power to the OBN 7 during flight.

According to the embodiment in FIG. 2, the first source of power for the OBN 7 is always the generator 16 that is arranged between the PTG 3 and the OBN 7 and associated with the AC-DC converter 17. In contrast, the second source of power for the OBN 7 is an APU 18 that provides an AC voltage of 115 volts and is connected to said AC-DC converter 17. In this embodiment, the starter-generator 4 of the architecture of FIG. 1 is replaced by a starter 40 of which the only function is to start up the turboshaft engine 2.

According to other embodiments that are not shown in the drawings, other combinations of sources of power for the OBN 7 can be used, such as two generators arranged between the PTG 3 and the OBN 7.

Each architecture further comprises items of equipment 9 that are supplied with high-voltage AC current directly by the generator 16 or by the APU 18. Said architecture also comprises a low-voltage storage battery 8.

In the following, the operating principle of the architecture of FIG. 1 is explained in detail with reference to FIGS. 3a to 3d. In FIGS. 3a to 3d, the bold lines show the main power circuits (mechanical or electrical) that are active between the various members shown.

FIG. 3a is a schematic view of the architecture from FIG. 1 during a conventional flight phase, i.e. a flight phase during which both turboshaft engines 1, 2 provide power to the PTG 3. This is, for example, a take-off or landing phase, during which the helicopter needs to have available the total power of the engines. The two power paths 21, 22 that are active between the turboshaft engines 1, 2 and the PTG 3 are shown schematically by bold lines in FIG. 3a. The supply of electrical power to the OBN 7 is made reliable by having two separate power supply circuits. The first circuit 23 supplies power to the OBN 7 by means of the starter-generator 4 of the turboshaft engine 2. The second circuit 24 supplies power to the OBN 7 by means of the generator 16 that is associated with the AC-DC converter 17.

FIG. 3b is a schematic view of the architecture from FIG. 1 during an economical flight phase, i.e. a flight phase during which the turboshaft engine 1 is put in a standby mode such that only the turboshaft engine 2 provides power to the PTG 3. Thus, only the power path 22 is active. The supply of electrical power to the OBN 7 is made reliable by the two power supply circuits described in connection with FIG. 3a. The first circuit 23 supplies the OBN 7 by means of the starter-generator 4 of the turboshaft engine 2. The second circuit 24 supplies the OBN 7 by means of the generator 16 that is associated with the AC-DC converter 17. The standby mode of the turboshaft engine 1 is assisted by the electrotechnical pack 20, which keeps the turboshaft engine 1 in a predetermined standby mode. This assistance is shown schematically in FIG. 3b by the circuit 25. This circuit comprises a low voltage-high voltage converter 14 that is arranged between the OBN 7 and the electrotechnical pack 20.

FIG. 3c is a schematic view of the architecture from FIG. 1 during a phase of restarting the turboshaft engine 1 when leaving standby normally. The turboshaft engine 2 provides power to the PTG 3. The power path 22 is therefore active. The power path 21 is being activated. In order to do this, the electrical machine 5 ensures the start-up of the turboshaft engine 1 by using the energy stored in the energy storage device 15. The supply of power to the electrical machine 5 is shown schematically by the circuit 26 in bold in FIG. 3c. The supply of electrical power to the OBN 7 is made reliable by the two power supply circuits described in connection with FIGS. 3a and 3b. The first circuit 23 supplies power to the OBN 7 by means of the starter-generator 4 of the turboshaft engine 2. The second circuit 24 supplies power to the OBN 7 by means of the generator 16 that is associated with the AC-DC converter 17.

FIG. 3d is a schematic view of the architecture from FIG. 1 during a phase in which the turboshaft engine 2 has been lost and the turboshaft engine 1 is being emergency restarted. During this phase, the turboshaft engine 2 has therefore failed and no longer provides any power to the PTG 3. The power path 22 is therefore inactive. The power path 21 is being activated. In order to do this, the device 6 for leaving standby in an emergency ensures the emergency start-up of the turboshaft engine 1. The activation of the device 6 for leaving standby in an emergency depends on the type of device used. A device 6 of this kind for leaving standby in an emergency is, for example, the propellant device described in FR 1358996 in the name of the applicant. The supply of electrical power to the OBN 7 is ensured by the second circuit 24, which supplies the OBN 7 by means of the generator 16. In contrast, the first circuit 23 no longer allows power to be supplied to the OBN 7 by means of the starter-generator 4 in the event of failure of the turboshaft engine 2.

The invention is not limited to the described embodiments only. In particular, the architecture can comprise three turboshaft engines for the equipment of a three-engine helicopter, while operating in a manner that is mutatis mutandis identical to that described in connection with a twin-engine application.

The invention claimed is:

1. An architecture of a propulsion system of a multi-engine helicopter, comprising turboshaft engines that are connected to a power transmission gearbox, and comprising a low DC voltage onboard network for supplying power to helicopter equipment during flight, wherein it comprises:

one turboshaft engine among said turboshaft engines, referred to as a hybrid turboshaft engine, which is capable of operating in at least one standby mode during a stable flight of the helicopter, the other turboshaft engines operating alone during this stable flight, an electrotechnical pack for quickly restarting said hybrid turboshaft engine in order bring said engine out of said standby mode and to reach a mode referred to as the nominal mode, in which it provides mechanical power to said power transmission gearbox, said restart pack being connected to said onboard network, at least two sources of electrical power for said onboard network.

2. The architecture according to claim 1, wherein said electrotechnical pack for quick restart is a high-voltage pack, and in that a low voltage-high voltage converter is arranged between said onboard network and said rapid restart pack.

3. The architecture according to claim 1, wherein said sources of electrical power for said onboard network are selected from the group comprising:

at least one current generator that is arranged between said power transmission gearbox and said onboard network and is associated with an AC-DC converter, an auxiliary power unit that is connected to said onboard network and associated with an AC-DC converter, a starter-generator that is arranged between a non-hybrid turboshaft engine and said onboard network.

4. The architecture according to claim 3, wherein each current generator and said auxiliary power unit are capable of providing an AC voltage of 115 volts, and in that said associated converter is capable of converting said 115-volt AC voltage into a DC voltage of 28 volts.

5. The architecture according to claim 1, wherein said electrotechnical pack comprises an electrical energy storage device which is capable of accumulating electrical energy from said onboard network during said nominal mode of said hybrid turboshaft engine, and which, following a command to leave standby, is capable of providing the hybrid turboshaft engine with the accumulated electrical energy that is necessary to ensure restart thereof.

6. The architecture according to claim 1, wherein said restart pack is capable of providing, when said hybrid turboshaft engine is in standby mode, electrical energy for keeping said hybrid turboshaft engine in a predetermined standby mode.

7. The architecture according to claim 1, wherein said quick restart pack comprises an electrical machine that is capable of restarting said turboshaft engine when leaving standby in normal conditions, and a device for leaving standby in an emergency that is capable of restarting said turboshaft engine when leaving standby in emergency conditions.

8. The architecture according to claim 7, wherein said device for leaving standby in an emergency is selected from the group comprising an electrotechnical device, a pyrotechnic device, a pneumatic device and a hydraulic device.

9. The helicopter comprising a propulsion system, wherein said propulsion system has an architecture according to claim 1.

* * * * *